United States Patent [19]

Mikami et al.

[11] Patent Number: 5,183,490
[45] Date of Patent: Feb. 2, 1993

[54] OPTICAL FIBER SOOT SYNTHESIS APPARATUS

[75] Inventors: Toshihiro Mikami, Ichihara; Yukio Kohmura, Chiba; Yoshinori Ishida; Akira Nogami, both of Ichihara, all of Japan

[73] Assignee: The Furukawa Electric Co., Ltd., Tokyo, Japan

[21] Appl. No.: 761,004

[22] Filed: Sep. 17, 1991

[30] Foreign Application Priority Data

Oct. 25, 1990 [JP] Japan .................................. 2-287731
May 8, 1991 [JP] Japan .................................. 3-102645
May 15, 1991 [JP] Japan .................................. 3-110142

[51] Int. Cl.⁵ .................... C03B 37/025; C03B 37/07
[52] U.S. Cl. ........................................ 65/144; 65/1;
  65/3.12; 65/18.2; 65/29; 65/160; 65/279;
  73/461; 73/477
[58] Field of Search ............... 65/1, 3.12, 12, 13,
  65/18.2, 29, 144, 160, 279, 292; 73/461, 473,
  477, 65

[56] References Cited

U.S. PATENT DOCUMENTS

| | | | |
|---|---|---|---|
| 3,805,624 | 4/1974 | Martin | 73/477 |
| 4,294,601 | 10/1981 | Dabby et al. | 65/144 |
| 4,632,574 | 12/1986 | Wilson et al. | 65/182.2 |
| 4,891,981 | 1/1990 | Schonfeld | 73/461 |
| 4,941,352 | 7/1990 | Fietzke | 73/65 |
| 5,030,266 | 7/1991 | Baltzer et al. | 65/279 |

FOREIGN PATENT DOCUMENTS 63-144139  6/1988  Japan.
63-285130  11/1988 Japan.
63-285131  11/1988 Japan.
2167838   6/1990  Japan.

Primary Examiner—Robert L. Lindsay
Attorney, Agent, or Firm—Staas & Halsey

[57] ABSTRACT

An optical fiber soot synthesis apparatus which synthesizes around a fiber starting member forming a core of an optical fiber an optical fiber soot forming a cladding and which accurately calculates in real time the mass of the optical fiber soot when deposited so as to control the synthesis of the optical fiber soot. The optical fiber soot synthesis apparatus measures the weight of the rotating fiber starting member and optical fiber soot by a pair of soot weight detection sensors arranged at a fiber starting member support and rotational drive mechanisms divided so as to prevent the weight of the rotational drive mechanisms from having much of an effect. The computation and control apparatus performs operational processing from the measured weights and calculates the mass of only the optical fiber soot synthesized on the fiber starting member in real time. The computation and calculation apparatus refers to the calculated mass to control the synthesis of the optical fiber soot.

33 Claims, 10 Drawing Sheets $$W = M \cdot g + m \cdot RL \cdot \omega^2 \cos\theta$$

OPTICAL FIBER SOOT SYNTHESIS APPARATUS

BACKGROUND OF THE INVENTION

1. Field of the Invention

The present invention relates to an apparatus for producing an optical fiber preform, more particularly relates to an optical fiber soot synthesis apparatus which synthesizes with a precise quality an optical fiber soot formed around a fiber starting member forming the core of the optical fiber.

2. Description of the Related Art

An optical fibers is comprised of a core of silica based glass and a cladding of silica based glass formed around the core and with an index of refraction lower than the core.

When producing an optical fiber, first the portion forming the core is produced by a vapor phase axial deposition (VAD) method and glassified to form the fiber starting member. Next, an optical fiber soot forming the cladding is synthesized around the fiber starting member. The optical fiber soot is synthesized by supplying, for example, $SiCl_4$ gas as the material of the optical fiber soot to the soot synthesis burner and hydrogen and oxygen as the material for the oxyhydrogen flame while controlling the mass so as to cause a chemical vapor deposition (CVD) reaction. This enables the production of an optical fiber preform comprised of a fiber starting member around which is formed an optical fiber soot.

Then, the optical fiber preform is heated and drawn. For example, in the case of a single mode optical fiber, the optical fiber is formed with a core of a diameter of 10 $\mu$m and a cladding of an outer diameter of 125 $\mu$m. This optical fiber is covered with a plastic resin layer.

The ratio between the core diameter and the cladding diameter must be precisely defined, so it is necessary to precisely produce the optical fiber soot on the fiber starting member.

In the past, the method was adopted of stopping the synthesis in the middle of the step of synthesizing the optical fiber soot and measuring the overall weight. The weight of the fiber starting member is known in advance, so by subtracting the weight of the fiber starting member from the overall weight, the weight of the optical fiber soot could be determined and the weight of the optical fiber soot could then be found.

Another conventional method was to glassify the optical fiber soot in the glassification process drawing the fiber from the optical fiber preform, then measure the ratio between the core diameter and the cladding diameter by optical measurement and if the cladding layer was insufficient, to resynthesize the optical fiber soot, and if excessive to etch it away.

When resynthesizing in the case of an insufficient cladding layer, the above-mentioned methods all present problems in that the once cooled cladding layer is reheated, so not only does the productivity fall, but the cladding layer also is placed in a state where it is easily damaged by heat shock.

Further, excessive cladding layer is etched away, so the productivity declines.

Therefore, attempts have been made to strictly control the mass, manage the manufacturing time, etc. so as to produce an optical fiber soot neither insufficient nor excessive, but fluctuations in the control of the mass are unavoidable due to limitations in the range of control of the mass control valves and thus precise mass control is not realized. As a result, even if the time is strictly managed, it is difficult to produce an optical fiber having a precise and stable core-cladding diameter ratio.

As disclosed in Japanese Unexamined Published Patent Application (Kokai) No. 63(1988)-144139, Japanese Unexamined Published Patent Application (Kokai) No. 63(1988)-285130, Japanese Unexamined Published Patent Application (Kokai) No. 63(1988)-285131, and Japanese Unexamined Published Patent Application (Kokai) No. 2(1990)-167838, attempts have been made to solve this problem by measuring the weight of the optical fiber soot in real time of the production process of the optical fiber.

The apparatus for production of an optical fiber preform disclosed in Japanese Unexamined Published Patent Application (Kokai) No. 63-144139 is a horizontal type apparatus for producing an optical fiber preform which is comprised of a base, two brackets standing at the both sides of the base, and a motor mounted to these brackets, the motor turning the fiber starting member in the horizontal direction. Under the base is arranged a load cell, which load cell measures the total weight of the overall structure of the base and brackets. The weight of the apparatus as a whole is usually about several hundred kilograms, so it is necessary to use a load cell with a wide measurement range. Due to restrictions in the resolution and precision of the load cell, it is not possible to measure the weight of the optical fiber soot to a precision of about 100 g.

In the optical fiber soot synthesis apparatus disclosed in Japanese Unexamined Published Patent Application (Kokai) No. 63-285130, there is disclosed a vertical type apparatus for producing an optical fiber preform wherein the fiber starting member is suspended vertically and rotated about the vertical direction axis and a burner is raised and lowered near the fiber starting member so as to synthesize an optical fiber soot on the fiber starting member. This apparatus for synthesizing an optical fiber soot first of all suffers from a disadvantage in that due to the vertical construction, the optical fiber soot is not uniformly synthesized due to the effects of gravity. Further, it is structured so that the weight of the suspended fiber starting member and optical fiber soot is measured by a weight measuring apparatus attached to the top portion, but this is affected by the shaft for rotating the fiber starting member, the bearings, and the belt for transmitting the power to the rotational shaft, etc., and therefore the weight of the fiber starting member and the optical fiber soot cannot be measured accurately.

The apparatus for producing an optical fiber preform disclosed in Japanese 'Unexamined Published Patent Application (Kokai) No. 63-285131 solves the disadvantage in the apparatus for producing an optical fiber preform disclosed in the above-mentioned Japanese Unexamined Published Patent Application (Kokai) No. 63-144139 by providing an integral structure of balance weights horizontally axially supported at the top of the brackets and a fiber starting member rotating mechanism and further by providing under the fiber starting member rotating mechanism an actuator for detecting the rotation of the fiber starting member rotating mechanism. That is, in this apparatus for producing an optical fiber preform, the intent is to measure the weight of only the fiber starting member and the optical fiber soot by the balance weights. However, the measurement of weight in this apparatus for producing an optical fiber preform calculates the weight of the optical fiber soot by detecting the rotational movement of the balance weights and the fiber starting member rotating mechanism rotating about the upper support points of the brackets, so accurate calculation of the weight is not possible. Further, it is necessary to change the angle of the burner with respect to the fiber starting member in accordance with the above rotation, so the control and the mechanism become extremely complicated.

The apparatus for producing an optical fiber preform disclosed in Japanese Unexamined Published Patent Application (Kokai) No. 2-167838 makes use of a weight measuring apparatus of the fiber starting member, the optical fiber soot, and the mechanism for rotating and supporting the two utilizing the lever principle to measure the weight of the fiber starting member and the optical fiber soot. Even in this apparatus for producing an optical fiber preform, however, the overall weight of the rotational drive mechanism is detected by the weight measuring apparatus, so it is not possible to measure the weight with a high resolution. Further, the weight measuring apparatus disclosed in Japanese Unexamined Published Patent Application (Kokai) No. 2-167838 has a complicated structure using the lever principle so has the problems of large dimensions, high price, and complicated adjustment work.

Further, the weight of the optical fiber soot cannot be accurately found using just the weight detected by a soot weight detection sensor. It is necessary to consider the center of gravity position of the rotating optical fiber soot and the like. None of the above-mentioned prior art suggest a method for measuring the weight of an optical fiber soot precisely.

SUMMARY OF THE INVENTION

An object of the present invention is to provide an optical fiber soot synthesis apparatus which can accurately detect the weight of an optical fiber soot.

Another object of the present invention is to provide an optical fiber soot synthesis apparatus which enables such accurate measurement of weight to be done in real time.

A further object of the present invention is to provide an optical fiber soot synthesis apparatus which can accurately calculate the mass from the above-mentioned weight of the optical fiber soot.

A still further object of the present invention is to provide an optical fiber soot synthesis apparatus which can synthesize an optical fiber soot with a high quality by real time feedback control of the mass of the optical fiber soot, detected in real time, in the process for synthesizing an optical fiber soot.

Therefore, according to the present invention, there is provided an optical fiber soot synthesis apparatus which synthesizes a fiber starting member including the core of an optical fiber and a soot, forming a cladding, on the fiber starting member to produce an optical fiber preform. The optical fiber soot synthesis apparatus includes a pair of fiber starting member support and rotational drive mechanisms which support and rotate the fiber starting member in the horizontal direction from the both sides, a burner which discharges the optical fiber soot material and oxyhydrogen flame to synthesize the optical fiber soot on the fiber starting member, a housing for accommodating the burner, fiber starting member, and synthesized optical fiber soot, a reciprocal movement mechanism which reciprocatively moves the burner and the fiber starting member relatively in the horizontal direction, and a pair of weight measuring apparatuses which are arranged at the insides of the pair of the fiber starting member support and rotational drive mechanisms and which measure the weight of the fiber starting member and the optical fiber soot synthesized and deposited on the fiber starting member.

Each of the above-mentioned, the fiber starting member support and rotational drive mechanisms is divided into two units and is constructed so that the overall weight of the fiber starting member support and rotational drive mechanism does not act on the weight measuring apparatuses.

The above-mentioned pair of fiber starting member support and rotational drive mechanisms have a pair of divided axial support mechanisms which axially support the above-mentioned fiber starting member from the two sides in the horizontal direction, a pair of axial rotational drive units which axially support the ends of the axial support mechanisms, a pair of first brackets which support in the vertical direction the pair of axial rotational drive units, a pair of second brackets which are provided at the fiber starting member sides at the insides of the pair of first brackets, and a pair of bearings which are disposed at the pair of second brackets and receive the pair of axial support mechanisms. The above-mentioned pair of weight measuring apparatuses are mounted to the above-mentioned pair of second brackets and measure the weight of the fiber starting member, the optical fiber soot formed on the fiber starting member, the above-mentioned pair of axial support mechanisms, and the above-mentioned pair of bearings.

The above-mentioned pair of axial support mechanisms are respectively connected by couplings between the above-mentioned first brackets and above-mentioned second brackets so that the axial rotational drive units and the first brackets do not affect the above-mentioned weight measuring apparatuses.

The apparatus for synthesizing an optical fiber has a computation and control apparatus which receives as input the weight measuring signals from the above-mentioned weight measuring apparatus and calculates the mass of the optical fiber soot deposited on the fiber starting member.

The above-mentioned computation and control apparatus stops the synthesis of the optical fiber soot when the mass of the optical fiber soot which has been calculated reaches a predetermined target value.

The above-mentioned computation and control apparatus rotates the above-mentioned axial support mechanisms by two different angular speeds through the above-mentioned axial rotational drive units and calculates the mass of the optical fiber soot deposited on the above-mentioned fiber starting member from the two measured weights of the above-mentioned weight measuring apparatuses at the respective angular speeds.

The optical fiber soot synthesizing apparatus further includes an angle detector for detecting a rotational angle of the fiber starting member. The computation and control apparatus reads the detected angle of the angle detector and reads the weights measured by the weight measuring apparatuses at a first rotational angle and a second rotational angle different by 180 degree to the first rotational angle to sum same, and calculates the mass of said optical soot from the sum of the measured weights.

Further, the above-mentioned pair of fiber starting member axial support and rotational drive mechanisms have a pair of axial support mechanisms which axially support the above-mentioned fiber starting member from the both sides in the horizontal direction, and a pair of axial rotational drive units which axially support the ends of the axial support mechanisms. The pair of weight measuring apparatuses are mounted inside the pair of axial support mechanisms and measure the weight of the fiber starting member and the optical fiber soot deposited on the fiber starting member.

The above-mentioned pair of axial support mechanisms are connected by couplings between the mounting positions of the above-mentioned weight measuring apparatuses and the above-mentioned axial rotational drive units so that the axial rotational drive units do not affect the above-mentioned weight measuring apparatuses.

Further, the above-mentioned pair of fiber starting member axial support and rotational drive mechanisms have a pair of drive side bearings disposed at opposing positions, a pair of drive side brackets disposed opposingly adjacent to and at the insides of the drive side bearings, a pair of driven side brackets disposed opposingly further inside, and an axial support mechanism which axially supports the fiber starting member between the opposing driven side brackets, which are respectively divided into a drive shaft portion and driven shaft portion, a pair of connection mechanisms which connect in a rotatable manner the above-mentioned drive shaft portions and driven shaft portions between the above-mentioned drive side brackets and the above-mentioned driven side brackets, a pair of driven side bracket vertical movement enabling mechanisms, which move the driven side brackets vertically in response to the weight applied to the above-mentioned driven side brackets, and a pair of rotational drive mechanisms which transmit rotation to the above-mentioned axial support mechanisms through the above-mentioned drive side bearings.

The weight measuring apparatuses are provided at beneath of the driven side bracket vertical movement enabling mechanisms. The above-mentioned rotational mechanisms are preferably universal joints.

The above-mentioned pair of fiber starting member axial support and rotational drive mechanisms have a pair of guide rails disposed in the vertical direction. The above-mentioned pair of driven side bracket vertical movement enabling mechanisms move the driven side brackets vertically along the guide rails.

The above-mentioned fiber starting member axial support and rotational drive mechanisms have frames arranged in the vertical direction and a pair of swiveling arms which are axially supported rotatably by the frames, to which swiveling arms are mounted the driven side brackets.

The above-mentioned pair of fiber starting member axial support and rotational drive mechanisms have a pair of frames arranged in the vertical direction, a pair of swiveling arms axially supported rotatably by the frames, and a pair of balance weights provided at one ends of the swiveling arms, the other ends of the swiveling arms having mounted to the driven side brackets.

The above-mentioned pair of fiber starting member axial support and rotational drive mechanisms have a pair of frames arranged in the vertical direction, a pair of tension springs fixed to the frames, and a pair of spring receiver arms connected to the free ends of the tension springs. The other ends of the spring receivers have connected to the above-mentioned driven side brackets through fulcrums.

The above-mentioned computation and control apparatus calculates the difference between the readings of the above-mentioned weight measuring apparatuses before the synthesis of the optical fiber soot and the readings of the above-mentioned weight measuring apparatuses during the synthesis of the optical fiber soot, calculates a position of gravity and the eccentric distance of the center of gravity position with respect to the center of the rotational axis of the optical fiber soot deposited on the fiber starting member, and calculate the mass of the optical fiber soot.

The above-mentioned computation and control apparatus uses the detected inclination of the inclination detection sensor to calculate the mass of the above-mentioned optical fiber soot.

Preferably, a pair of balance weights which prevent the inclination of the driven side brackets, are provided at positions opposite to the driven side brackets.

The driven side brackets are provided with inclination detecting sensors. The computation and control apparatus adjusts positions of the balance weights by using values detected by the inclination detecting sensors to prevent the inclination of the driven side brackets.

The pair of fiber starting member axial support and rotational drive mechanisms have a pair of vertical movement guide mechanisms which are rotated the pivot axis in response to the descent of the driven side brackets.

The optical fiber soot synthesis apparatus has a rotation and reciprocal drive mechanism which rotates the fiber starting member and the axial support mechanism which axially supports and reciprocatively moves the fiber starting member in the horizontal direction with respect to the fixed burner. Further, the optical fiber soot synthesis apparatus has a mechanism for reciprocatively moving the burner in the horizontal direction with respect to the fiber starting member rotating at a fixed position.

The optical fiber soot synthesis apparatus also includes a pair of fiber starting member support and rotational drive mechanisms which support a fiber starting member from the both sides in a horizontal direction and rotate about a horizontal shaft and which are arranged opposingly, a burner which synthesizes an optical fiber soot forming a cladding of the optical fiber on the fiber starting member, and a pair of weight measuring apparatuses which measure the weight of the fiber starting member and the optical fiber soot synthesized and deposited on said fiber starting member at the pair of fiber starting member support and rotational drive mechanisms.

The optical fiber soot synthesis apparatus further includes weight adjusting mechanisms mounted on the pair of fiber starting member support and rotational drive mechanisms. The weight adjusting mechanisms keep a balance of the fiber starting member support and rotational drive mechanisms at a predetermined position, in response to the increase in weight of the optical fiber soot which increases as synthesized, so that the weight measuring apparatus measure the weight of the fiber starting member and the optical fiber soot free from a bending force due to the increase of the weight of the optical fiber soot, applied to the fiber starting member support and rotational drive mechanisms.

BRIEF DESCRIPTION OF THE DRAWINGS

The above mentioned objects and features of the present invention and other objects and features will be explained in more detail with reference to the attached drawings, wherein.

DESCRIPTION OF THE PREFERRED EMBODIMENTS

Figure 1:
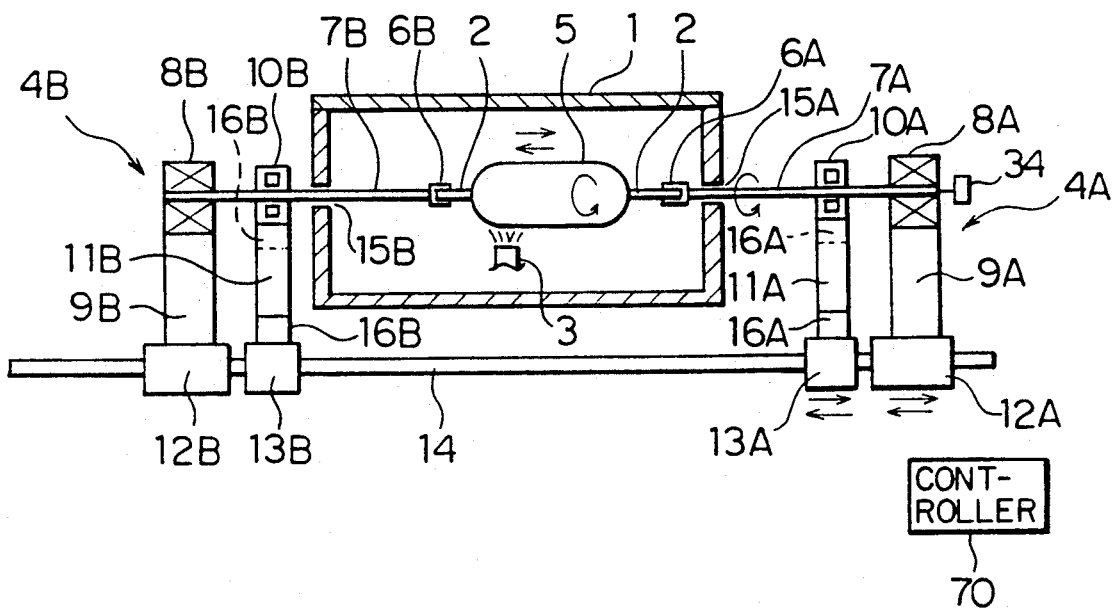
FIG. 1 is a structural view of an optical fiber soot synthesis apparatus of a first embodiment of the present invention.

An optical fiber soot synthesis apparatus of a first embodiment of the present invention will be explained below with reference to FIG. 1.

A housing 1 of the optical fiber soot synthesis apparatus has inside it a fiber starting member 2 axially supported horizontally by a pair of divided fiber starting member axial support and rotational drive mechanisms 4A and 4B. A soot synthesis burner 3 is disposed opposing the fiber starting member 2. The fiber starting member 2 is rotated by the fiber starting member axial support and rotational drive mechanisms 4A and 4B and is reciprocatively driven relatively in the horizontal direction with respect to the soot synthesis burner 3. In the process of the reciprocative drive, a cladding layer optical fiber soot 5 is synthesized around the fiber starting member 2 by, for example, the $SiCl_4$ gas and oxyhydrogen flame discharged from the burner 3.

The fiber starting member axial support and rotational drive mechanisms 4A and 4B have shafts 7A and 7B which support the fiber starting member 2 horizontally through chucks 6A and 6B positioned at the both ends of the fiber starting member 2, bearings 10A and 10B which are provided outside of the housing 1, axial rotational drive units 8A and 8B which rotate the shafts 7A and 7B synchronously, and first brackets 9A and 9B which support these axial rotational drive units 8A and 8B. The fiber starting member axial support and rotational drive mechanisms 4A and 4B further have second brackets 11A and 11B which rotatably support the shafts 7A and 7B through the bearings 10A and 10B, first movable tables 12A and 12B which carry the first brackets 9A and 9B and move them in the horizontal direction, and second movable tables 13A and 13B which carry the second brackets 11A and 11B. Further, the fiber starting member axial support and rotational drive mechanisms 4A and 4B have a reciprocal drive threaded shaft 14 which passes through the first movable tables 12A and 12B and the second movable tables 13A and 13B and which is screw coupled with the same to reciprocatively drive the first movable tables 12A and 12B and the second movable tables 13A and 13B in the horizontal direction with the same orientation.

By the rotation of the reciprocal drive threaded shaft 14, the first movable tables 12A and 12B and the second movable tables 13A and 13B move in the same direction, and, the first brackets 9A and 9B and axial rotational drive units 8A and 8B on the first movable tables 12A and 12B, and the second brackets 11A and 11 and bearings 10A and 10B on the second movable tables 13A and 13B simultaneously move horizontally and the fiber starting member 2 moves horizontally.

The fiber starting member axial support and rotational drive mechanisms 4A and 4B have guide rails (not shown) which guide the reciprocal movement of the first movable tables 12A and 12B and the second movable tables 13A and 13B.

The through holes through which the shafts 7A and 7B are passed from the housing 1 are sealed by the sealing portions 15A and 15B so that negative pressure is held in the housing 1 and the synthesis of the optical fiber soot in the housing 1 can be performed reliably.

In the optical fiber soot synthesis apparatus of the first embodiment, a pair of soot weight detection sensors 16A and 16B are interposed between the second brackets 11A and 11B and the second movable tables 13A and 13B, one of the portions where the weight of the soot 5 acts at the fiber starting member axial support and rotational drive mechanisms 4A and 4B.

As these soot weight detection sensors 16A and 16B, use is made of strain gauges or load cells.

The soot weight detection sensors 16A and 16B are connected to a computation and control apparatus 70 realized by a microcomputer, which calculates the mass from the weight of the optical fiber soot 5 measured by the soot weight detection sensors 16A and 16B and controls the operation of the optical fiber soot synthesis apparatus.

In the optical fiber soot synthesis apparatus, the computation and control apparatus 70 drives the fiber starting member axial support and rotational drive mechanisms 4A and 4B to rotate the fiber starting member 2 and reciprocatively moves the fiber starting member 2 and the optical fiber soot 5 in the horizontal direction so as to synthesize and deposit the optical fiber soot 5 around the fiber starting member 2 by the synthesis by, for example, the SiCl₄ gas and the oxyhydrogen flame ejected from the burner 3. The exhaust gas is exhausted from the exhaust port (not shown).

The weight of the soot 5 which is synthesized is detected in the process of synthesis continuously by the soot weight detection sensors 16A and 16B, and the mass of the optical fiber soot 5 is accurately calculated in real time in the computation and control apparatus 70 connected to the soot weight detection sensors 16A and 16B.

If the computation and control apparatus 70 performs the predetermined computations and judges that the optical fiber soot 5 has been synthesized to a predetermined mass, the computation and control apparatus 70 stops the synthesis of the optical fiber soot 5.

The fiber starting member 2 upon which the optical fiber soot 5 has been deposited at a predetermined mass and the synthesis has been completed is detached from the chucks 6A and 6B and taken out to the outside of the housing 1 and then the next new fiber starting member 2 is axially supported by the chucks 6A and 6B in the housing 1 and a new optical fiber soot 5 is synthesized on the new soot fiber 2.

The clearance of the sealing portions 15A and 15B is about 0.1 mm to 1.0 mm, but gas inside the housing 1 is not discharged to the outside of the housing 1 since the inside of the housing 1 is at negative pressure.

Further, it is possible to purge the nitrogen gas from the nitrogen gas insertion port (not shown) so as to achieve an excellent sealing performance of the sealing portions 15A and 15B.

As explained above, the soot weight detection sensors 16A and 16B are inserted between the second movable tables 13A and 13B and the second brackets 11A and 11B and measure the weight of the fiber starting member 2 and the optical fiber soot 5 synthesized around the fiber starting member 2. The computation and control apparatus 70 subtracts from the total weight measured by the soot weight detection sensors 16A and 16B the known weights of the second brackets 11A and 11B, the bearings 10A and 10B, the shafts 7A and 7B, the chucks 6A and 6B, and the fiber starting member 2 to calculate the weight of the synthesized optical fiber soot 5 and calculates the mass of the same.

Below, an explanation will be made of an experimental example of the first embodiment of the present invention.

EXPERIMENTAL EXAMPLE 1

Weight of soot 5 and fiber starting member 2: 4 kg
Rotational speed of fiber starting member 2: 250 rpm
Speed of reciprocal movement of fiber starting member 2: 100 mm/min.
Pressure in housing 1: 740 Torr
Measurement precision of soot weight detection sensors 16A and 16B: 50 g (0.05%)
Total weight acting on right side soot weight detection sensors 16A of soot 5: 100 kg In this way, the soot weight detection sensors 16A and 16B use load cells having a measurement range of about 100 kg and can measure the weight of the optical fiber soot 5 to a precision of 50 g.

Note that as shown by the broken line in FIG. 1, the soot weight detection sensors 16A and 16B can be interposed between the bearings 10A and 10B and the second brackets 11A and 11B. In this case, the soot weight detection sensors 16A and 16B are not subjected to the weight of the second brackets 11A and 11B, so the range of measurement of the soot weight detection sensors 16A and 16B can be made that much smaller and the resolution and precision become higher, so the precision of measurement of weight of the optical fiber soot 5 is further improved.

An explanation will now be made of the method for precisely calculating the mass from the measured weight of the optical fiber soot 5.

Figure 2:
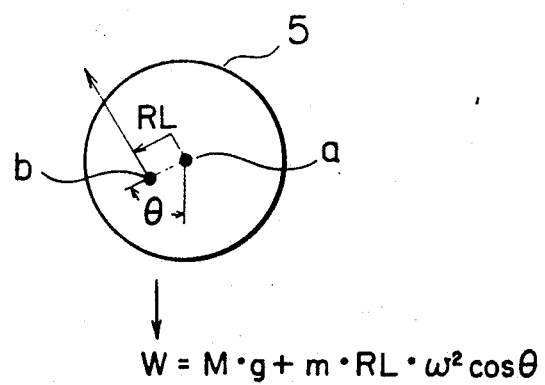
FIG. 2 is a view showing the principle of measurement of the mass of a cladding layer soot in the optical fiber soot synthesis apparatus shown in FIG. 1.

FIG. 2 is a sectional view of the optical fiber soot 5 shown in FIG. 1.

The above-mentioned weight is applied to the soot weight detection sensors 16A and 16B and the fluctuating force shown in equation 1, generated by the rotation of the fiber starting member 2, acts on the same.

$$W = M \cdot g + m \cdot RL \cdot \omega^2 \tag{1}$$

where,
W is the weight detected by the soot weight detection sensors 16A and 16B.
g is the acceleration of gravity,
M is the mass of the soot 5,
m is the eccentric mass of the soot 5,
$\omega$ is the angular speed, and
RL is the distance from the center of rotation of the soot 5 to the center of gravity g of the soot 5.

The mass M indicates the combined mass of the optical fiber soot 5 desired to be found, but the mass M of the optical fiber soot 5 cannot be calculated as is due to the existence of the unknown second term at the right side of equation 1.

There are the following two methods for canceling out the second term on the right side of equation 1.

Method 1

If the angular speed $\omega$ of the fiber starting member 2 is changed from $\omega_1$ to $\omega_2$ and the weights $W_1$ and $W_2$ detected by the soot weight detection sensors 16A and 16B are measured, the following equations are obtained:

$$W_1 = M \cdot g + m \cdot RL \cdot \omega_1^2 \tag{2}$$

$$W_2 = M \cdot g + m \cdot RL \cdot \omega_2^2 \tag{3}$$

The weights $W_1$ and $W_2$ are values measured by the soot weight detection sensors 16A and 16B. The angular speeds $\omega_1$ and $\omega_2$ are settings which are both known. If these values are inserted into equation 2 and equation 3, (m·RL) can be found. If the calculated (m·RL) is inserted into equation 2 or equation 3, (M·g) can be calculated. The acceleration of gravity g is known, so the mass M of the optical fiber soot 5 can be calculated in the computation and control apparatus 70. An example of the calculation equation is given in equation 4.

$$M = (W_2 \omega_1^2 - W_1 \omega_2^2) / g(\omega_1^2 - \omega_2^2) \tag{4}$$

The computation and control apparatus 70 rotates the fiber starting member 2 at a first angular speed $\omega_1$ and reads the first weight $W_1$ from the soot weight detection sensors 16A and 16B, then immediately thereafter rotates the fiber starting member 2 at a second angular speed $\omega_2$ and reads the second weight $W_2$ from the soot weight detection sensors 16A and 16B, so can calculate the mass M of the optical fiber soot synthesized on the fiber starting member 2 from equation 4.

Method 2

The weight W detected by the soot weight detection sensors 16A and 16B differs according to the center of gravity position b of the optical fiber soot 5. In FIG. 2, a symbol a shows the center of rotation, b the center of gravity position, RL the distance from the center of rotation a to the center of gravity position b, and $\Theta$ the angle formed by the perpendicular line passing through the center of rotation a and the line connecting the center of rotation a and the center of gravity position b. In this case, equation 5 stands:

$$W = M \cdot g + m \cdot RL \cdot \omega_2 \cdot \cos \Theta \tag{5}$$

If the weight W ($\Theta$) and W ($\Theta + \pi$) are measured at positions differing by 180 degrees, the following equation is obtained:

$$W(\Theta) = M \cdot g + m \cdot RL \cdot \omega^2 \cdot \cos \Theta \tag{6}$$

$$W(\Theta + \pi) = M \cdot g - m \cdot RL \cdot \omega^2 \cdot \cos \Theta \tag{7}$$

From the two equations, if ($m \cdot RL \cdot \omega^2 \cdot \cos \Theta$) is canceled out, then the following is obtained:

$$M = (W(\Theta) + W(\Theta - \pi))/2g \tag{8}$$

The computation and control apparatus 70 solves equation 8 whereby it can calculate the mass M of the optical fiber soot 5 synthesized on the fiber starting member 2.

In the method 2, in addition to the soot weight detection sensors 16A and 16B, a rotary encoder 34 is provided at an end of the shaft 7A to detect a rotational angle of the fiber starting member 2. The computation and control apparatus 70 reads a rotational angle of the fiber starting member 2 detected by the rotary encoder 34, reads the weights $W(\Theta)$ and $W(\Theta + \pi)$ from the fiber soot weight detection sensors 16A and 16B at different angles $\Theta$ and ($\Theta + \pi$), and calculates the mass M is accordance with equation 8.

As explained above, according to the method of method 1 or method 2, the computation and control apparatus 70 calculates in real time, in the process of synthesis of the optical fiber soot 5, the accurate mass M of the optical fiber soot 5 from the weight of the optical fiber soot 5 measured by the soot weight detection sensors 16A and 16B and feed backs the results to the synthesis operation of the optical fiber soot 5. When the mass of the optical fiber soot 5 reaches a predetermined mass, the computation and control apparatus 70 stops the synthesis processing of the optical fiber soot 5, so it is possible to synthesize the optical fiber soot 5 with extreme precision.

Therefore, according to the embodiment of the optical fiber soot synthesis apparatus of the present invention, after the synthesis of the optical fiber soot 5 is completed, there is no longer any need to resynthesize to make up for any insufficient portion or etch away and remove an excess portion as in the above-mentioned prior art. As a result, it is possible to improve the productivity of the synthesis of the optical fiber soot and shorten the production time. Further, troublesome work for adjusting the excess or shortage of the mass of the optical fiber soot 5 becomes unnecessary and also the problems of heat damage etc. to the cladding portions accompanying resynthesis performed when the mass is insufficient are eliminated.

Preferably, when the optical fiber soot 5 is synthesized, a layer which forms a part of the cladding is previously deposited on the fiber starting member 2 by a burner (not shown) different to the above-mentioned burner 3.

In the context of the specification, the layer deposited on the fiber starting member 2 is deemed as a part of the fiber starting member 2, and thus the fiber starting member 2 may include the layer forming a part of the cladding in this specification.

Figure 3:
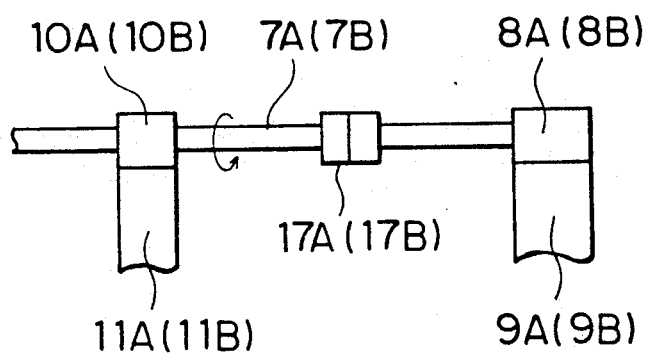
FIG. 3 is a partial structural view showing a modification of the optical fiber soot synthesis apparatus shown in FIG. 1.

FIG. 3 shows the partial structure of a modification of the optical fiber soot synthesis apparatus of the first embodiment of the present invention.

In FIG. 3, a coupling 17A is interposed in the shaft 7A between the right side rotational drive unit 8A and the bearing 10A. Further, as shown by the references in parentheses, a coupling 17B is interposed in the shaft 7B between the left side rotational drive unit 8B and the bearing 10B.

The coupling 17A (17B) transmits rotation force from the axial rotational drive unit 8A (8B) to the fiber starting member 2, but the weight of the axial rotational drive unit 8A (8B) is not transmitted to the soot weight detection sensors 16A (16B). As a result, the weight minus the weight of the axial rotational drive units 8A and 8B can be measured by the soot weight detection sensors 16A and 16B. The weights of the axial rotational drive units 8A and 8B are not applied to the soot weight detection sensors 16A and 16B. A narrow range of measurement of the sensors 16A and 16B enables an improvement of the resolution and an improvement of the precision and a greater improvement of the precision of measurement of the weight of the optical fiber soot 5.

Figure 4:
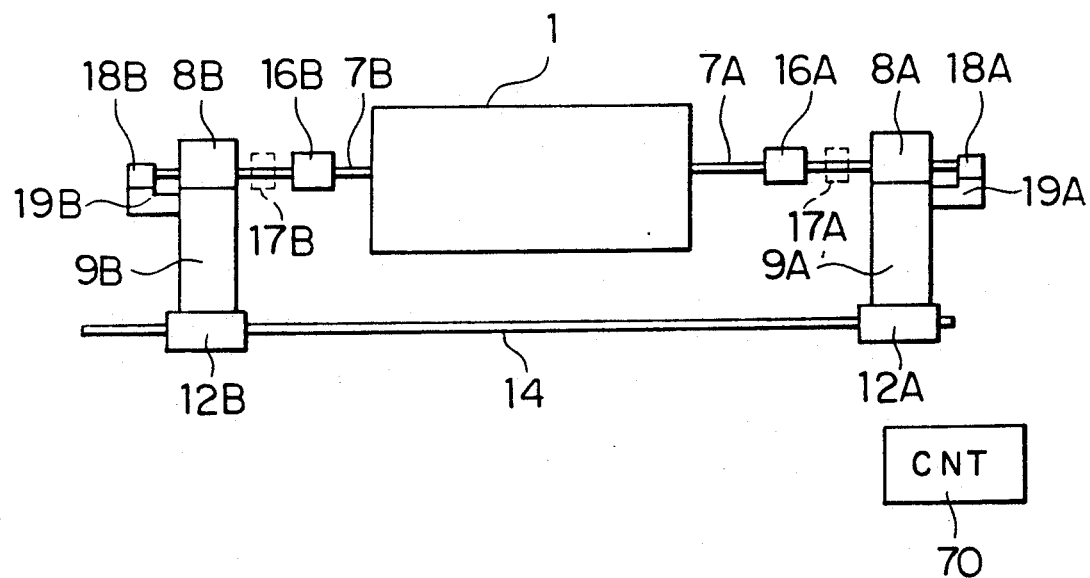
FIG. 4 is a structural view of an optical fiber soot synthesis apparatus of a second embodiment of the present invention.

Referring to FIG. 4, a second embodiment of the optical fiber soot synthesis apparatus of the present invention will be explained. In the optical fiber soot synthesis apparatus shown in FIG. 4, members the same as members constituting the optical fiber soot synthesis apparatus in FIG. 1 are given the same reference numerals. In FIG. 4, the fiber starting member 2, the burner 3, the optical fiber soot 5, and the chucks 6A and 6B arranged in the housing 1 are omitted.

In the optical fiber soot synthesis apparatus shown in FIG. 4, the bearings 10A and 10B, the second brackets 11A and 11B, and the second movable tables 13A and 13B arranged in the optical fiber soot synthesis apparatus illustrated in FIG. 1 are deleted. On the other hand, in the optical fiber soot synthesis apparatus shown in FIG. 4, the soot weight detection sensors 16A and 16B are interposed in the middle of the shafts 7A and 7B. The taking out of the detection signals from these soot weight detection sensors 16A and 16B to the computation and control apparatus 70 and the supply of drive power of the soot weight detection sensors 16A and 16B are performed from the ends of the shafts 7A and 7B through the slip rings 18A and 18B. The slip rings 18A and 18B are supported by the first brackets 9A and 9B through the arms 19A and 19B.

According to this structure, the soot weight detection sensors 16A and 16B can measure only the weight of the fiber starting member 2, the optical fiber soot 5, and the chucks 6A and 6B.

The soot weight detection sensors 16A and 16B receive force in three-dimensional directions, but the forces detected by the soot weight detection sensors 16A and 16B are analyzed and processed by the computation and control apparatus 70 to calculate the precise mass of the optical fiber soot 5.

The detection signals of the soot weight detection sensors 16A and 16B, as mentioned above, are not only connected to the computation and control apparatus 70 by the wired method through the slip rings 18A and 18B, but can wirelessly connect the computation and control apparatus 70 and the soot weight detection sensors 16A and 16B.

Even in the optical fiber soot synthesis apparatus shown in FIG. 4, like with the optical fiber soot synthesis apparatus shown in FIG. 3, as shown by the broken lines, the couplings 17A and 17B can be interposed in the portions of the shafts 7A and 7B between the soot weight detection sensors 16A and 16B and the axial rotational drive units 8A and 8B. By this, the soot weight detection sensors 16A and 16B are freed from the effects of the weights of the axial rotational drive units 8A and 8B at the outside of the couplings 17A and 17B, the weights of the optical fiber soot 5, the fiber starting member 2, and the chucks 6A and 6B can be measured, and the mass of the optical fiber soot 5 can be calculated more precisely at the computation and control apparatus 70.

Further, the soot weight detection sensors 16A and 16B can be interposed in the connection portions of the chucks 6A and 6B and the shafts 7A and 7B, just the weights of the optical fiber soot 5 and fiber starting member 2 measured, and thus the mass of the optical fiber soot 5 calculated.

An explanation will now be made of a third embodiment of the optical fiber soot synthesis apparatus of the present invention referring to FIG. 5 and FIG. 6. FIG. 6 is a sectional view seen from the line A—A of FIG. 5.

Due to factors of illustration. FIG. 5 does not show the housing 1, but the housing contains the fiber starting member 2, the optical fiber soot 5, the soot synthesis burner 3, the chucks 6A and 6B, and part of the shafts 7A and 7B.

Figure 5:
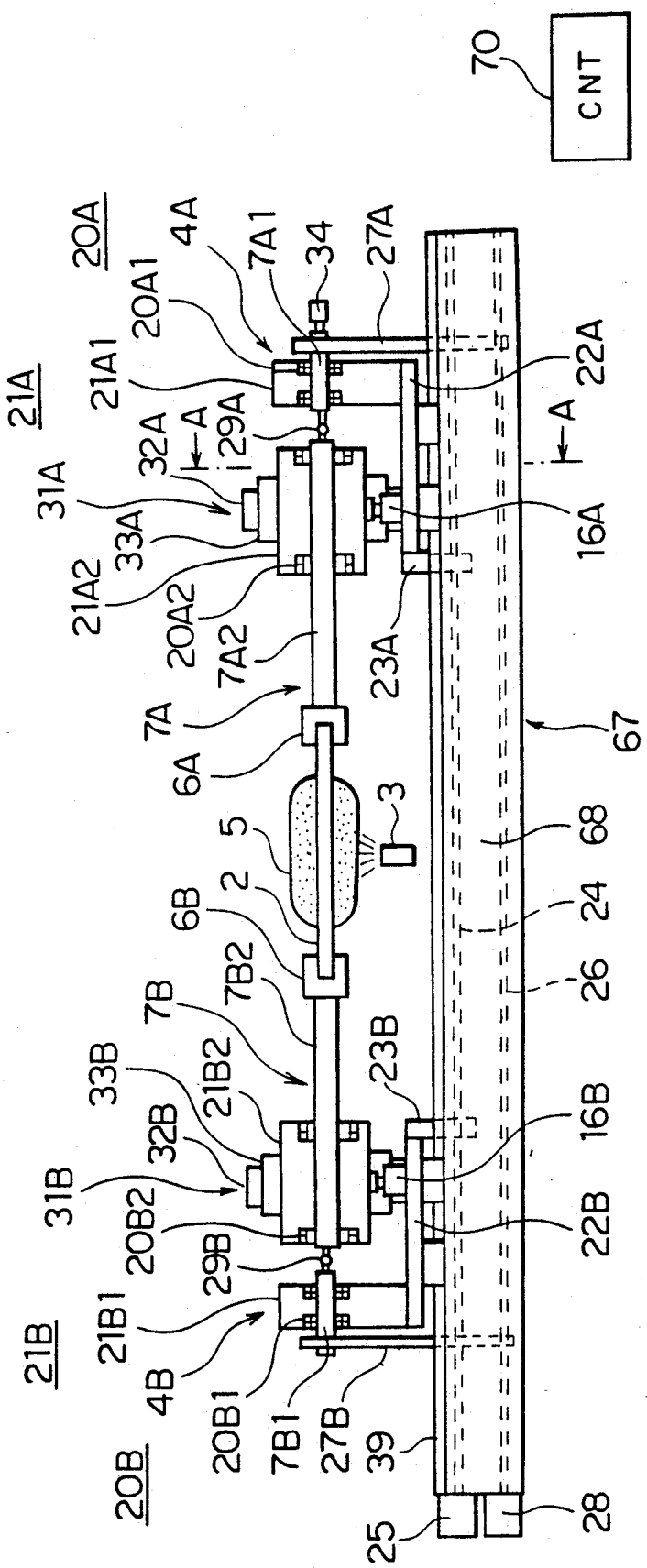
FIG. 5 is a structural view of an optical fiber soot synthesis apparatus of a third embodiment of the present invention.
Figure 6:
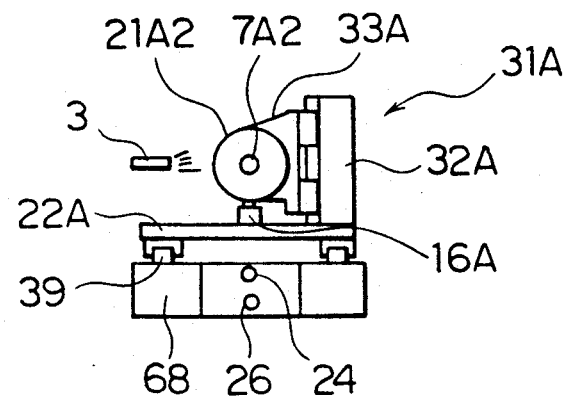
FIG. 6 is a sectional view along line A—A in FIG. 5, in particular a sectional view of a driven side bracket vertical movement enabling mechanism.

The optical fiber soot synthesis apparatus shown in FIG. 5 has the fiber starting member axial support and rotational drive mechanisms 4A and 4B and the rotational reciprocal drive mechanism 67 which reciprocatively moves the fiber starting member axial support and rotational drive mechanisms 4A and 4B to the left and right and rotates the optical fiber soot 5.

The soot weight detection sensors 16A and 16B are provided under the driven side brackets 21A2 and 21B2 constituting the brackets 21A and 21B.

The fiber starting member axial support and rotational drive mechanisms 4A and 4B have a common bed 68, a rail 39 arranged on the bed 68 in a direction parallel to the fiber starting member 2, and brackets 21A and 21B. The brackets 21A and 21B, which reciprocatively move simultaneously in the same direction, guided by the rail 39, are comprised of the drive side brackets 21A1 and 21B1 and the driven side brackets 21A2 and 21B2. The shafts 7A and 7B are rotatably supported through the bearings 20A and 20B comprised of the drive side bearings 20A1 and 20B1 and the driven side bearings 20A2 and 20B2.

To synthesize the optical fiber soot 5 on the fiber starting member 2 uniformly, provision is made of a rotation and reciprocal drive mechanism 67 which rotates the optical fiber soot 5 and reciprocatively moves it with respect to the burner 3. This rotation and reciprocal drive mechanism 67 is comprised of nut members 23A and 23B provided integrally with the base members 22A and 22B of the brackets 21A and 21B, screws 24 fastened to the nut members 23A and 23B provided in parallel with the shafts 7A and 7B, a fiber starting member reciprocal movement motor 25 which reciprocatively moves the fiber starting member 2 with respect to the burner 3 through the brackets 21A and 21B and the shaft 7A and 7B etc. by rotating the screws 24, a threaded shaft 26 which is provided in parallel with the screws 24, rotation transmission members 27A and 27B which transmit the rotational force of the threaded shaft 26 to the shafts 7A and 7B, and a fiber starting member rotation motor 28 which rotates the fiber starting member 2 around the axial center through the shafts 7A and 7B by rotating the threaded shaft 26.

The shafts 7A and 7B are divided into the drive shaft portions 7A1 and 7B1 and the driven shaft portions 7A2 and 7B2. These drive shaft portions 7A1 and 7B1 and driven shaft portions 7A2 and 7B2 are connected mutually by the universal joints 29A and 29B. The universal joints 29A and 29B act as rotation transmitting means and absorb the displacement at the connection portions of the drive shaft portions 7A1 and 7A2 and the driven shaft portions 7A2 and 7B2 while connecting these drive shaft portions 7A1 and 7B1 and driven shaft portions 7A2 and 7B2.

The shafts 7A and 7B, as mentioned above, are divided into the drive shaft portions 7A1 and 7B1 and the driven shaft portions 7A2 and 7B2 so as to free the measurement of the weight by the soot weight detection sensors 16A and 16B from the effects of the weight of the drive side brackets 21A1 and 21B1 and the downward bending of the shafts 7A and 7B accompanying the increase in mass of the optical fiber soot 5 due to the progress in the synthesis. As a result, the soot weight detection sensors 16A and 16B are directly loaded by almost 100% of the weight of the optical fiber soot 5 which is increased due to the progress in the synthesis.

Along with constructing the shafts 7A and 7B divided into the drive shaft portions 7A1 and 7B1 and the driven shaft portions 7A2 and 7B2, the brackets 21A and 21B of the fiber starting member axial support and rotational drive mechanisms 4A and 4B are also divided into the drive side brackets 21A1 and 21B1 and the driven side brackets 21A2 and 21B2.

The drive shaft portions 7A1 and 7B1 and the driven shaft portions 7A2 and 7B2 are respectively supported rotatably through the drive side bearings 20A1 and 20B1 and the driven side bearings 20A2 and 20B2 by the drive side brackets 21A1 and 21B1 and the driven side brackets 21A2 and 21B2. The drive shaft portions 7A1 and 7B1 have transmitted to them rotational force through the rotation transmission members 27A and 27B. The drive side brackets 21A1 and 21B1 are arranged on the base members 22A and 22B.

The driven side brackets 21A2 and 21B2 are supported through the soot weight detection sensors 16A and 16B on the base members 22A and 22B.

As the soot weight detection sensors 16A and 16B, use is made of a load cell or strain gauge of a measurement rating (measurement range) of 50 kg.

The driven side brackets 21A2 and 21B2 are movably supported in a vertical direction by the driven side bracket vertical movement enabling mechanisms 31A and 31B comprised of linear guides. The driven side bracket vertical movement enabling mechanisms 31A and 31B are comprised of the guide rails 32A and 32B and the vertical movement members 33A and 33B which can rise and descend guided by the guide rails 32A and 32B and which support the driven side brackets 21A2 and 21B2.

At the end of the drive shaft portion 7A1 is provided a rotary encoder 34 which detects the rotation of the same.

Figure 7A:
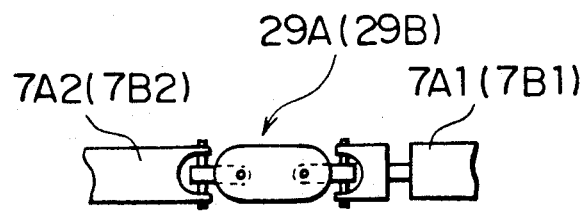
FIGS. 7A and 7B are views illustrating a universal joint in FIG. 5.
Figure 7B:
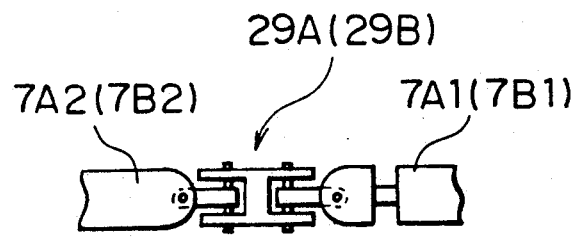

FIGS. 7A and B show the construction of the universal joints 29A and 29B.

The weight of the optical fiber soot 5 increases along with the progress in the synthesis of the optical fiber soot 5. Along with the increase in the weight of the optical fiber soot 5, the driven side brackets 21A2 and 21B2 are displaced downward slightly due to the deformation of the soot weight detection sensors 16A and 16B. At this time, the axial centers of the drive shaft portions 7A1 and 7B1 and the driven shaft portions 7A2 and 72 deviate, for example, by several tens of microns.

This deviation is absorbed by the universal joints 29A and 29B. This prevents the deviation from causing the drive shaft portions 7A1 and 7B1 to bear part of the load which should be applied to the soot weight detection sensors 16A and 16B and cause an error in the measurement of the weight.

Therefore, even if the weight of the optical fiber soot 5 increases along with the progress of the synthesis, due to the universal joints 29A and 29B, there is no effect of the increasing weight, the soot weight detection sensors 16A and 16B can precisely measure the weight of the optical fiber soot 5, and the computation and control apparatus 70 can use the results of the measurement to precisely calculate the mass of the synthesized optical fiber soot 5.

Further, even which a force other than gravity acts on the driven side brackets 21A2 and 21B2, the driven side brackets 21A2 and 21B2 are supported by the driven side bracket vertical movement enabling mechanisms 31A and 31B so that the movement except of the vertical direction is restricted, so it is possible to prevent the driven side brackets 21A2 and 21B2 from displacing due to force other than gravity and the soot weight detection sensors 16A and 16B can measure the weight of the optical fiber soot 5 precisely.

To improve a quality of the optical fiber soot 5, it is necessary to consider the center of gravity position of the optical fiber soot 5 in addition to accurately measuring the weight by the soot weight detection sensors 16A and 16B.

An explanation will now be given of the method for finding the weight (mass) and center of gravity position of the optical fiber soot 5 referring to FIGS. 8A to 8D.

When the fiber starting member 2 is mounted between the chucks 6A and 6B and the fiber starting member 2 is rotated by the rotational speed N, it is possible to detect from the two soot weight detection sensors 16A and 16B the load Wa ($\Theta$) and Wb ($\Theta$) which repeatedly change in synchronization with the rotational speed N of the drive shaft portions 7A1 and 7B1. Here, $\Theta$, as shown in FIG. 2, is the rotational angle of the drive shaft portions 7A1 and 7B1 and has as the point facing directly under the fiber starting member 2 the point of $\Theta = 0$.

The reasons for the fluctuation of the loads Wa ($\Theta$) and Wb ($\Theta$) are the bending of the drive shaft portions 7A1 and 7B1, the deviation of the axial centers of the drive shaft portions 7A1 and 7B1 and the driven shaft portions 7A2 and 7B2, etc., so while it is possible to reduce this to a certain extent by adjustment, it is not possible to completely eliminate the fluctuations of the loads Wa ($\Theta$) and Wb ($\Theta$). Therefore, the computation and control apparatus 70 has to calculate the mass M of the soot 5 considering the error arising due to the fluctuations of the loads Wa ($\Theta$) and Wb ($\Theta$).

Below, an explanation will be made of a method for eliminating the error.

Figure 8A:
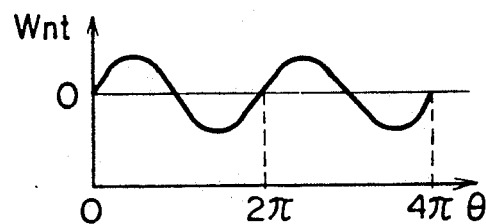
FIGS. 8A to 8D are views explaining a method of measuring weight in the optical fiber soot synthesis apparatus shown in FIG. 5.

The fluctuations of the load Wa ($\Theta$) and Wb ($\Theta$) have no relation to the change in weight of the soot 5 (increase). There is no change in so far as there is no exchange of the fiber starting member 2 or readjustment of the optical fiber soot synthesis apparatus. Therefore, the computation and control apparatus 70 measures the sum Wnt ($\Theta$) of the loads Wa ($\Theta$) and Wb ($\Theta$), which are the detection outputs of the two soot weight detection sensors 16A and 16B, $$Wnt(\Theta) = Wa(\Theta) + Wb(\Theta) \tag{5}$$

before the synthesis of the optical fiber soot 5 and records the relationship between the $\Theta$ and the Wnt ($\Theta$) shown in FIG. 8A. Wnt ($\Theta$) shows the error arising due to mechanical precision.

Figure 8B:
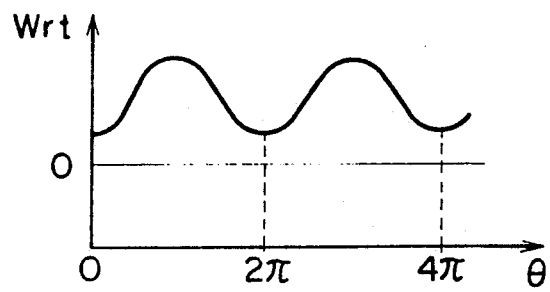

After this, when the synthesis of the optical fiber soot 5 is started, during the process of synthesis of the optical fiber soot 5, the sum of the loads Wrt ($\Theta$) differ from that before the synthesis is found, as shown in FIG. 8B. The computation and control apparatus 70 records this sum.

If the difference between the load Wnt ($\Theta$) and Wrt ($\Theta$) is found, it is possible to eliminate the error arising due to mechanical precision and find the true fluctuating load $W^*$ ($\Theta$) by the following equation:

$$W^*(\Theta) = Wrt(\Theta) - Wnt(\Theta) \tag{6}$$

Figure 8C:
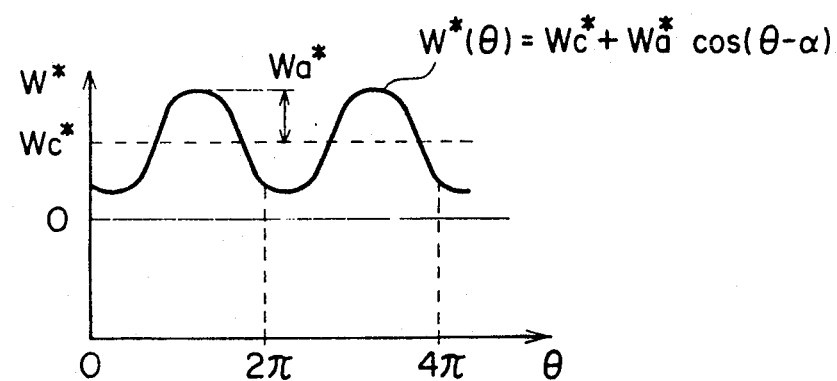

The true load is shown in FIG. 8C.

The thus calculated fluctuating load $W^*$ ($\Theta$) is the sum of the weight of the optical fiber soot 5 and the component of the vertically downward oriented force of the centrifugal force of the deviation due to the eccentricity of the center of gravity position of the optical fiber soot 5. This is approximated by the following equation:

$$W^*(\Theta) = W^*c(\Theta) + W^*a(\Theta) \cos(\Theta - \alpha) \tag{7}$$

where,
$W^*c(\Theta)$ is the value at the center of the fluctuation of $W^*(\Theta)$,
$W^*a(\Theta)$ is the centrifugal force,
$\alpha$ is the phase angle of the eccentricity of the soot 5.

The eccentricity RL at the center of gravity position G may be found as the following from the relationship of the centrifugal force = (mass) × (radius) × (angular speed)$^2$:

$$W^*a(\Theta) = W^*c(\Theta) \times RL \times (2\pi N)^2$$

$$RL = W^*a(\Theta) / [W^*c(\Theta) \times (2\pi N)^2] \tag{8}$$

Figure 8D:
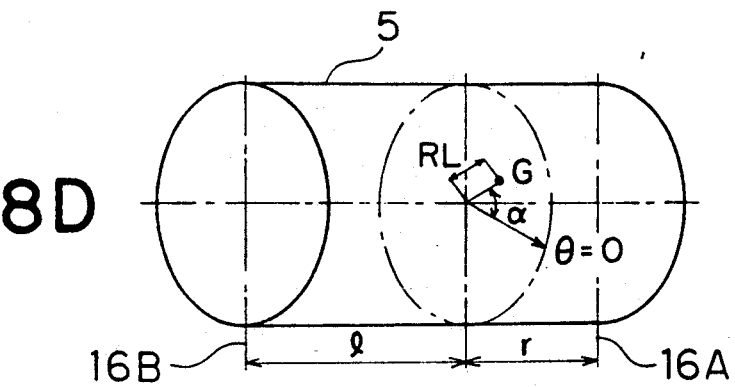

Further, if the ratio of the time averages of the load divided by the two soot weight detection sensors 16A and 16B is taken, then as shown in FIG. 8D, the ratio of the average values becomes as in the following equations:

l:r = (average of measured values of right side sensor 16A):average of measured values of left side sensor 16B)  (9)

or l+r = (distance between two sensors 16A and 16B)  (10)

From the above equation, it is possible to find the distance l from the position of the left side sensor 16B to the center of gravity position G and the distance r from the right side sensor 16A to the center of gravity position G.

The above computation is performed at high speed in real time in the computation and control apparatus 70, which is comprised of a computer.

When synthesizing an optical fiber soot 5 on the fiber starting member 2, the various different members mounted on the bed 68 and comprising the optical fiber soot synthesis apparatus move to the right and left along with the reciprocal movement of the optical fiber soot 5, but the speed of the movement, as mentioned above, is about 100 mm/min., so is relatively low and there is almost no effect on the measurement of the weight of the optical fiber soot 5 even when the direction of movement changes.

In the above-mentioned optical fiber soot synthesis apparatus, the mass of the soot 5 can be measured within the measurement range of plus or minus 50 g with respect to the target mass of synthesis of the optical fiber soot 5. In this case, the control of the computation and control apparatus 70 controls an amount of the material gas from the burner 3 and/or a speed of movement of the fiber starting member 2, and enables position of the center of gravity position G to within 2 mm from the axial center in the radial direction and within 5 mm in the longitudinal direction.

Figure 9:
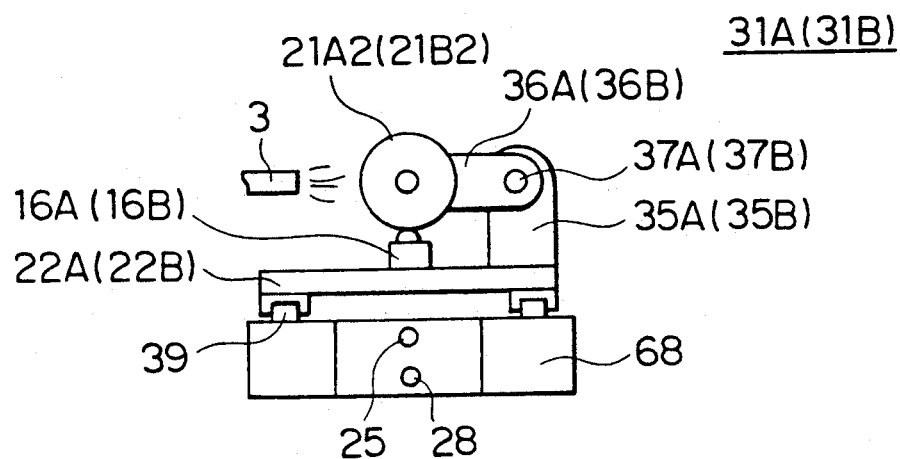
FIG. 9 is a sectional view showing another structure of the driven side bracket vertical movement enabling mechanism shown in FIG. 5.

FIG. 9 shows another sectional construction of the driven side bracket vertical movement enabling mechanisms 31A and 31B which allow vertical movement of the driven side brackets 21A2 and 21B2.

The soot weight detection sensors 16A and 16B are carried on the base members 22A and 22B.

The driven side bracket vertical movement enabling mechanisms 31A and 31B are comprised as a hinge type by the frames 35A and 35B standing on the base members 22A and 22B and the swiveling arms 36A and 36B rotatably supported at one ends by the shafts 37A and 37B at the frames 35A and 35B and rotatably supporting at the other ends the driven side brackets 21A2 and 21B2.

According to this construction of the hinge-type driven side bracket vertical movement enabling mechanisms 31A and 31B, it is possible to suppress low the height of the optical fiber soot synthesis apparatus. If the height of the optical fiber soot synthesis apparatus becomes low, then not only can the optical fiber soot synthesis apparatus be made compact, but also the constituent members of the optical fiber soot synthesis apparatus moving along with the reciprocal movement of the optical fiber soot 5 become smaller and the factors for error in the measurement of weight by the soot weight detection sensors 16A and 16B are reduced.

Figure 10:
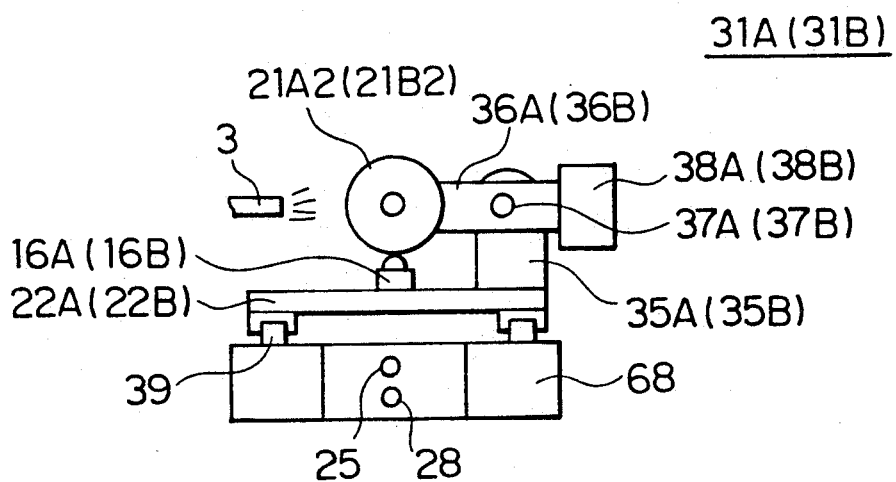
FIG. 10 is a structural view showing a still other structure of the driven side bracket vertical movement enabling mechanism shown in FIG. 5.

FIG. 10 shows another sectional construction of the driven side bracket vertical movement enabling mechanisms 31A and 31B which allow vertical movement of the driven side brackets 21A2 and 21B2.

The soot weight detection sensors 16A and 16B are emplaced on the base members 22A and 22B.

The driven side bracket vertical movement enabling mechanisms 31A and 31B are comprised by the frames 35A and 35 standing on the base members 22A and 22B and the swiveling arms 36A and 36B rotatably supported at their centers by the shafts 37A and 37B at the frames 35A and 35B and supporting at one ends the driven side brackets 21A2 and 21B2 and supporting at the other ends the balance weights 38A and 38B.

According to this construction of the driven side bracket vertical movement enabling mechanisms 31A and 31B, due to the presence of the balance weights 38A and 38B, it is possible to make the weight applied on the soot weight detection sensors 16A and 16B smaller, and preferably it is possible to make it smaller to the extent of the weight of only the optical fiber soot 5 synthesized, and, further it is possible to make smaller the measurement rating of the soot weight detection sensors 16A and 16B, so the resolving power and measurement precision of the soot weight detection sensors 16A and 16B are improved. As a result, the precision of calculation of the mass of the optical fiber soot 5 by the computation and control apparatus 70 becomes higher.

According to this embodiment, the distance from the axial center of the shafts 37A and 37B, the support points of the balances, to the center of gravity positions of the balance weights 38A and 38B is 250 mm and the weights of the balance weights 38A and 38B are 25 kg. Under these conditions, it is possible to lower the measurement ratings of the soot weight detection sensors 16A and 16B to 10 kg, so the precision of the calculated mass of the optical fiber soot 5 is improved to a precision of plus or minus 10 g with respect to the target mass.

An explanation will now be given of a fourth embodiment of the optical fiber soot synthesis apparatus of the present invention referring to FIG. 11.

This optical fiber soot synthesis apparatus merely rotates the optical fiber soot 5 about its axial center and does not reciprocatively move it, but on the other hand the soot synthesis burner 3 is made to reciprocatively move in the longitudinal direction of the fiber starting member 2. That is, the burner 3 shown in FIG. 1 and FIG. 5 was fixed, but in this embodiment the burner 3 is conversely made to reciprocatively move.

The soot weight detection sensors 16A and 16B are arranged at the bottom of the driven side bracket vertical movement enabling mechanisms 31A and 31B divided by the universal joints 29A and 29B. At the ends of the shafts 7A1 and 7B1 on the brackets 21A and 21B, rotary encoders 34A and 34B, which detect the rotational angle of the shafts 7A1 and 7B1, are provided. The other parts opf the construction are basically the same as shown in FIG. 5.

Figure 11:
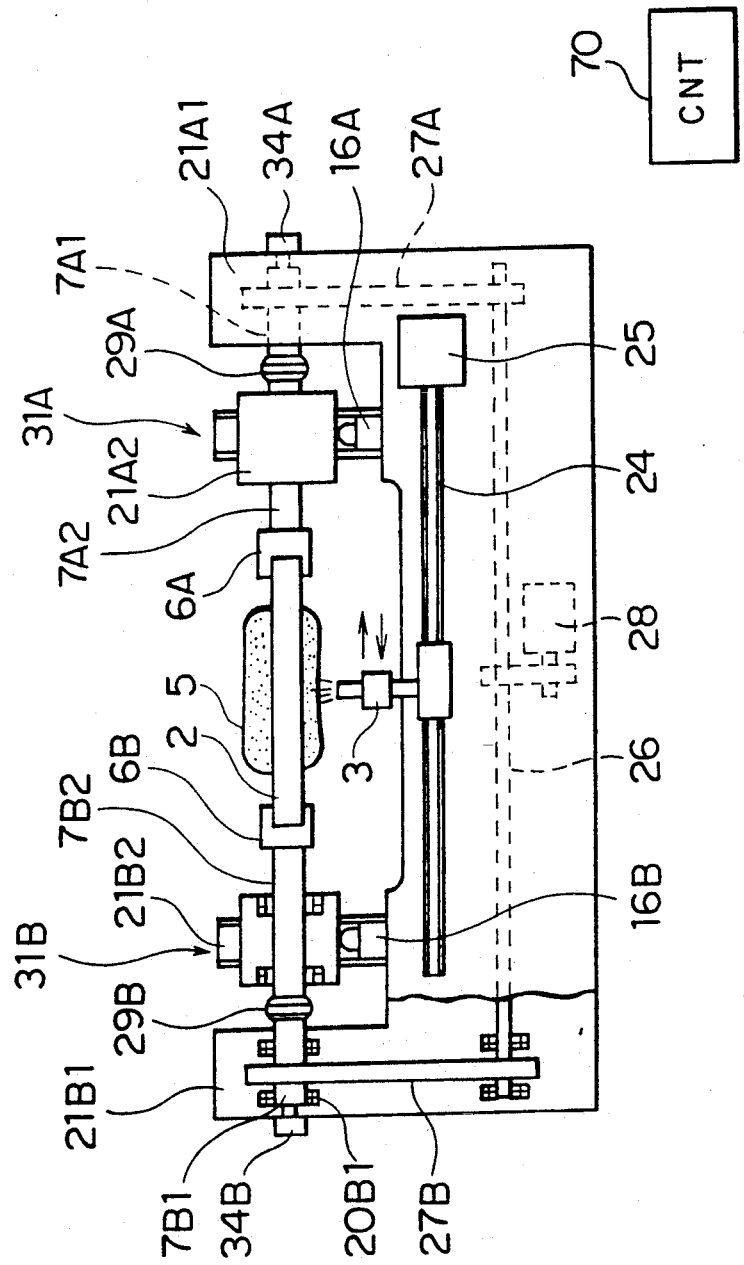
FIG. 11 is a structural view of an optical fiber soot synthesis apparatus of a fourth embodiment of the present invention.

The construction shown in FIG. 11 enables the length in the longitudinal direction of the optical fiber soot synthesis apparatus to be reduced. Further, since the optical fiber soot 5 does not reciprocatively move, the causes of generation of measurement error accompanying the movement of the optical fiber soot 5 are reduced.

Figure 12:
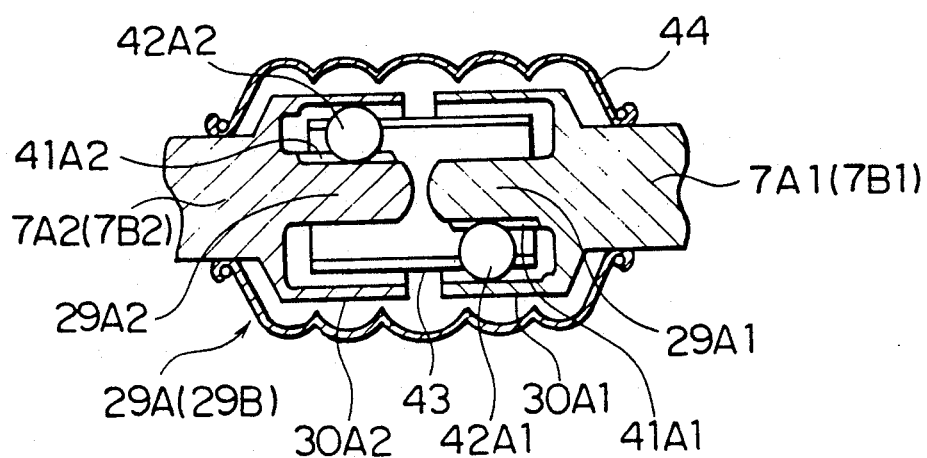
FIG. 12 is a detailed view of a universal joint in FIG. 11.

FIG. 12 shows an example of the construction of the universal joints 29A and 29B of the optical fiber soot synthesis apparatus shown in FIG. 11.

The universal joints 29A and 29B are provided with coaxial structures comprised of the center members 29A1 and 29A2 and the outer surrounding members 30A1 and 30A2 at the mutual end faces of the drive shaft portions 7A1 and 7B1 and the driven shaft portions 7A2 and 7B2. Grooves 41A1 and 41A2 are provided at one location in the circumferential directions of the center members 29A1 and 29A2. At the position of the grooves 41A1 and 41A2, balls 42A1 and 42A2 are interposed between the center members 29A1 and 29A2 and the outer surrounding members 30A1 and 30A2. To grip these balls 42A1 and 42A2, the two ends of a common rotational force transmission arc piece 43 is inserted into the space between the two center members 29A1 and 29A2 and the outer surrounding members 30A1 and 30A2. These members are surrounded at the outer circumference by a common cover 44.

Due to the universal joints 29A and 29B of this structure, the deviation etc. between the above-mentioned drive shaft portions 7A1 and 7B1 and the driven shaft portions 7A2 and 7B2 are smoothly absorbed and the precision of measurement of the weight of the optical fiber soot 5 by the soot weight detection sensors 16A and 16B is improved.

Note that as the rotational transmission means absorbing the displacement of the shaft at the driven portion, use may be made of a universal joint, magnetic coupling, fluid coupling, etc. in addition to the above-mentioned universal joints 29A and 29B.

Figure 13:
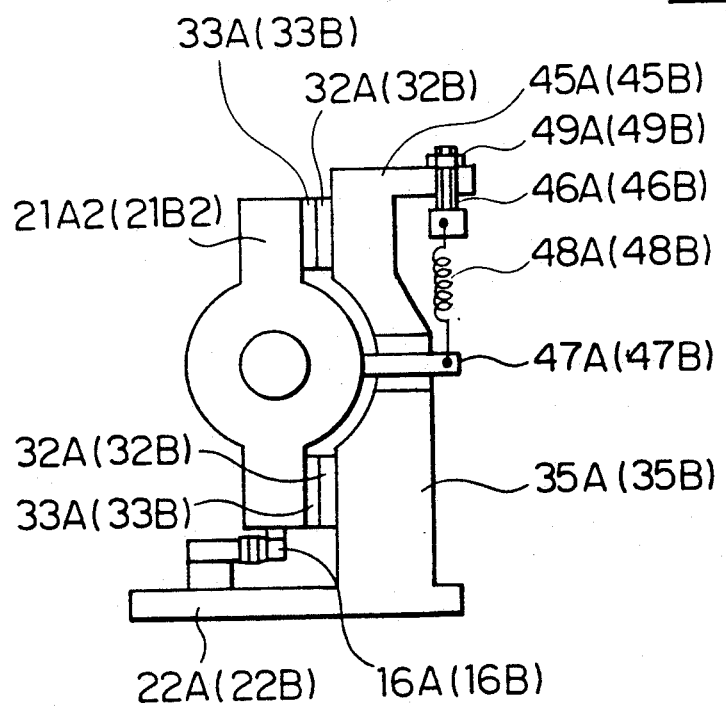
FIG. 13 is a sectional view showing the structure of the driven side bracket vertical movement enabling mechanism shown in FIG. 5.

FIG. 13 is still another structural sectional view of driven side bracket vertical movement enabling mechanisms 31A and 31B allowing vertical movement of the driven side brackets 21A2 and 21B2.

The driven side bracket vertical movement enabling mechanisms 31A and 31B shown in FIG. 13 are comprised of the guide rails 32A and 32B provided at the sides of the frames 35A and 35B standing on the base members 22A and 22B, the guide rail vertical movement members 33A and 33B supporting the driven side brackets 21A2 and 21B2 moving vertically guide by the guide rails 32A and 32B, adjustment screws 46A and 46B passing through the horizontal brackets 45A and 45B at the top ends of the frames 35A and 35B by screw connection, the spring receiver arms 46A and 47B provided at the driven side brackets 21A2 and 21B2, the tension springs 48A and 48B stretched between the adjustment screws 46A and 46B and the spring receiver arms 47A and 47B, and the adjustment nuts 49A and 49B, in which the adjustment screws 46A and 46B are screwed, for adjusting the tension of the tension springs 48A and 48B.

Even with the driven side bracket vertical movement enabling mechanisms 31A and 31B of this construction, in the same way as the balance weights 38A and 38B shown in FIG. 10, it is possible to reduce the weight acting on the soot weight detection sensors 16A and 16B due to the existence of the tension springs 48A and 48B, the measurement rating of the soot weight detection sensors 16A and 16B becomes lower, and it is possible to raise the resolving power and measurement precision of the measurement of the weight of the optical fiber soot 5.

The overall length of the tension springs 48A and 48B in this example is 150 mm, the spring constant is 5000 N/m, and the tension is adjusted by the adjustment screws 46A and 46B. The total weight of the driven shaft portions 7A2 and 7B2 and the driven side brackets 21A2 and 21B2 is 38 kg, and the measurement range of the soot weight detection sensors 16A and 16B was 10 kg.

By the optical fiber soot synthesis apparatus using the driven side bracket vertical movement enabling mechanisms 31A and 31B shown in FIG. 13, at the stage before the attachment of the fiber starting member 2, the tensions of the tension springs 48A and 48B are adjusted so that a load of 3 kg is applied to the soot weight detection sensors 16A and 16B. The weight of the optical fiber soot 5 at the time of synthesis of the optical fiber soot 5 is adjusted by the tension springs 48A and 48B, then the weight of the soot 5 at the time of synthesis of the optical fiber soot 5 is measured by the soot weight detection sensors 16A and 16B. In this example, part of the weight of the optical fiber soot 5 is borne by the tension springs 48A and 48B, so the true weight of the optical fiber soot 5 is calculated.

The value at the time of the end of the completion of synthesis of the optical fiber soot 5 was compared with the value measured by another precise balance. As a result, the difference was a maximum 7 g. That is, if the driven side bracket vertical movement enabling mechanisms 31A and 31B according to FIG. 13 are used, it is possible to measure the weight of the optical fiber soot 5 extremely precisely by the soot weight detection sensors 16A and 16B and, finally, it is possible to calculate the mass of the optical fiber soot 5 extremely accurately by the computation and control apparatus 70.

Note that as another method for canceling out the weight of the members applied to the soot weight detection sensors 16A and 16B, it is possible to apply electromagnetic force, flotation force, etc. instead of the tension springs 48A and 48B shown in FIG. 13.

Figure 14:
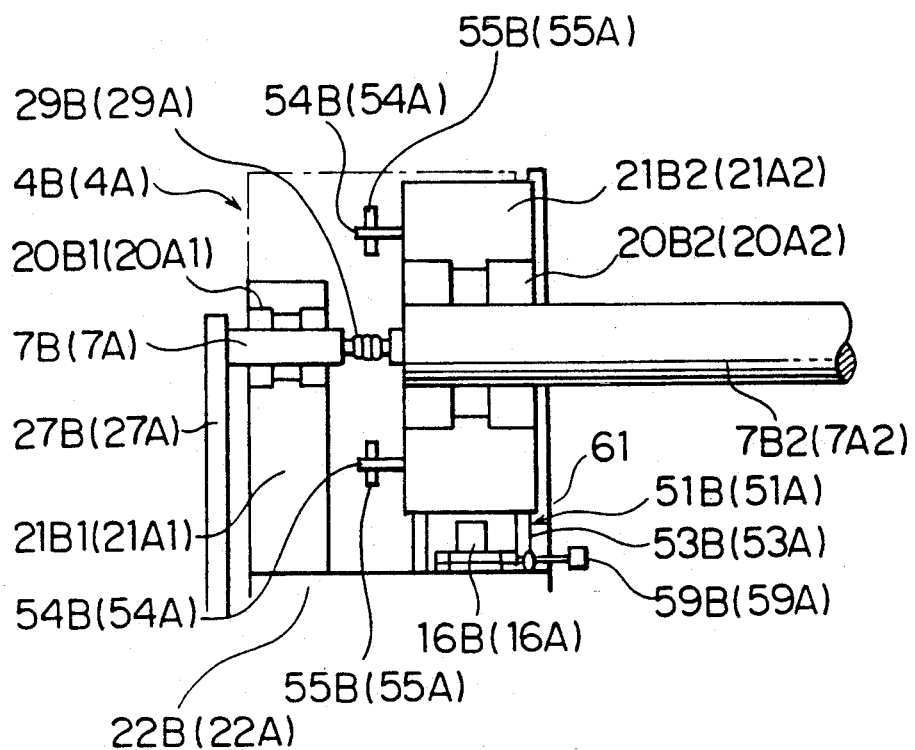
FIG. 14 is a structural view of the compensation for an inclination of a driven side bracket of the optical fiber soot synthesis apparatus of the present invention shown in FIG. 11 and the detection of the inclination.
Figure 15:
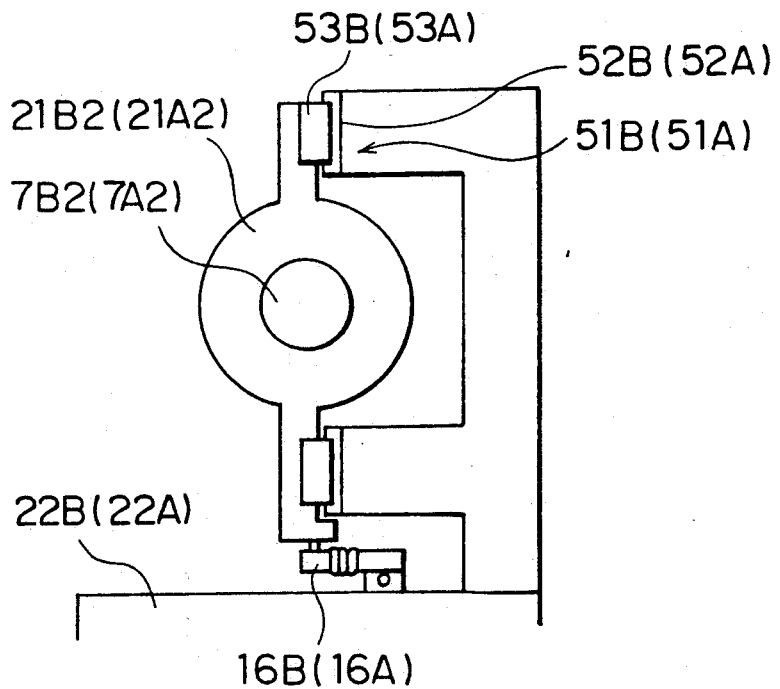
FIG. 15 is a partial sectional view of an optical fiber soot synthesis apparatus of an embodiment of the present invention.

FIG. 14 and FIG. 15 are partial sectional structural views of an optical fiber soot synthesis apparatus of another embodiment of the present invention.

At the surfaces opposite to the both sides of the driven side brackets 21A2 and 21B2 facing the optical fiber soot 5, for example, at top and bottom positions, are projected horizontally the slide guide shafts 54A and 54B supported in a cantilever fashion. To these slide guide shafts 54A and 54B are fit in a slidable manner the balance weights 55A and 55B with respect to the weight of the optical fiber soot 5, the driven shaft portions 7A2 and 7B2, etc.

The positions of these balance weights 55A and 55B are changed in a direction to prevent inclination of the driven side brackets 21A2 and 21B2 corresponding to the increase in weight of the optical fiber soot 5 detected by the soot weight detection sensors 16A and 16B. By this, it is possible to prevent inclination of the driven side brackets 21A2 and 21B2 arising due to the weight of the optical fiber soot 5, the driven shaft portions 7A2 and 7B2, etc. acting on the driven side brackets 21A2 and 21B2. As a result, it is possible to reduce the friction force occurring in the vertical movement mechanisms 51A and 51B guiding the vertical movement of the driven side brackets 21A2 and 21B2 and it is possible to calculate the weight (mass) of the same during the synthesis of the optical fiber soot 5 with a high precision.

At the optical fiber soot synthesis apparatuses in FIG. 14 and FIG. 15 are arranged the guide rails 52A and 52B and the sliding members 53A and 53B.

As an embodiment, as the soot weight detection sensors 16A and 16B, use is made of beam type load cells with a measurement rating of 60 kg, as the sliding members 52A and 53B of the vertical movement mechanisms 51A and 51B use is made of cross roller guides with a roller diameter of 4 mm, and as the universal joints 29A and 29B, use is made of universal joints with a static allowable torque of 12 kg·m.

Figure 16:
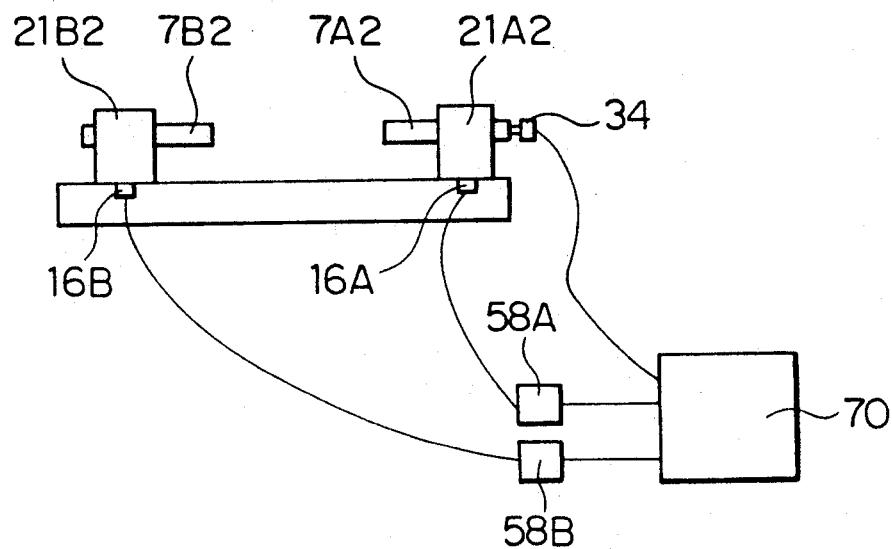
FIG. 16 is a structural view of a measuring system in the optical fiber soot synthesis apparatus of the present invention.

FIG. 16 shows the construction of an optical fiber soot weight (mass) calculating system in the optical fiber soot synthesis apparatus showing the partial construction shown in FIG. 14 and FIG. 15.

The rotational angles of the drive shaft portions 7A1 and 7B1 and the driven shaft portions 7A2 and 7B2 are detected by a rotary encoder 34 and are input to the computation and control apparatus 70. Further, the detection signals from the soot weight detection sensors 16A and 16B are amplified by the strain amplifiers 58A and 58B and input to the computation and control apparatus 70.

The detection signals from the soot weight detection sensors 16A and 16B are amplified by the strain amplifiers 58A and 58B, the average weight processed to be averaged over time in the computation and control apparatus 70 is calculated, the sums of these are sought, and the weight (mass) during synthesis of the soot 5 is calculated in real time.

EXPERIMENTAL EXAMPLE 2

Table 1 shows a comparison of the results of measurement of weight of the soot 5 in the measurement system shown in FIGS. 14 and 15 (experimental example) and the results of measurement of weight in the optical fiber soot synthesis apparatus shown in FIG. 5 (comparative example).

In the measurement, instead of an optical fiber soot, a 1000 g weight was measured 10 times each.

TABLE 1

|  | Experimental example | Comparative example |
| --- | --- | --- |
| Minimum measured value | 991 g | 942 g |
| Maximum measured value | 1005 g | 1013 g |
| Average value | 998 g | 976 g |
| Maximum-minimum | 14 g | 71 g |

As clear from the results of the above comparison, according to the embodiment of the construction shown in FIGS. 14 and 15, it is possible to improve much more the precision of measurement of weight of the optical fiber soot. In this experimental example, it is possible to measure the weight of the optical fiber soot 5 with a precision of plus or minus 10 g.

Referring again to FIG. 14 and FIG. 15, a further explanation will be made of the optical fiber soot synthesis apparatus of the present invention.

In this embodiment too, at the top and bottom of the surfaces opposite to the two sides of the driven side brackets 21A2 and 21B2 facing the optical fiber soot 5 are projected in a horizontal direction the slide guide shafts 54A and 54B supported in a cantilever fashion. To predetermined positions of the slide guide shafts 54A and 54B are fit balance weights 55A and 55B with respect to the weights of the optical fiber soot 5, the driven shaft portions 7A2 and 7B2, etc. and fixed at suitable positions.

Below the soot weight detection sensors 16A and 16B are arranged the soot weight detection sensor position adjustment mechanisms 59A and 59B which change the position of the soot weight detection sensors 16A and 16B with respect to the driven side brackets 21A2 and 21B2 in the direction to prevent the inclination of the driven side brackets 21A2 and 21B2 in accordance with the increase of weight of the optical fiber soot 5 detected by the soot weight detection sensors 16A and 16B.

The positions of the soot weight detection sensors 16A and 16B with respect to the driven side brackets 21A2 and 21B2 are changed, in accordance with the increase in the weight of the optical fiber soot 5 detected by the soot weight detection sensors 16A and 16B, in the direction of preventing of inclination of the driven side brackets 21A2 and 21B2 by the soot weight detection sensor position adjustment mechanisms 59A and 59B. By this, it is possible to suppress the inclination of the driven side brackets 21A2 and 21B2 arising due to the weight of the optical fiber soot 5, the driven shaft portions 7A2 and 7B2, etc. acting on the driven side brackets 21A2 and 21B2, it is possible to reduce the frictional force occurring at the vertical movement mechanisms 51A and 51B guiding the vertical movement of the driven side brackets 21A2 and 21B2, and it is possible to measure the weight in real time with a high precision during the synthesis of the optical fiber soot 5.

The above-mentioned embodiment was explained with reference to an example where the optical fiber soot synthesis burner 3 was fixed in place, but as explained with reference to FIG. 11, it is also possible to construct the assembly so that the burner 3 is moved and the fiber starting member 2 and the optical fiber soot 5 is merely rotated and not reciprocatively moved in the horizontal direction.

Note that the vertical movement guide mechanisms 51A and 51B are not limited to two columns as illustrated, and may be comprised of one, three, or four or more as well.

To detect the inclination of the driven side brackets 21A and 21B, it is preferable to provide load sensors, fine displacement measurement apparatuses, or other inclination detection sensors 61 at part of the vertical movement guide mechanisms 51A and 51B. The computation and control apparatus 70 receives as input the detection values of the inclination detection sensors 61 and change the positions of the balance weights 55A and 55B or the soot weight detection sensors 16A and 16B. By this, the precision of measurement of the weight of the optical fiber soot 5 by the soot weight detection sensors 16A and 16B is improved much more.

Further, it is possible to structure the assembly so that the soot weight detection sensors 16A and 16B are arranged at the top of the driven side brackets 21A2 and 21B2, while the driven side brackets 21A2 and 21B2 and the driven shaft portions 7A2 and 7B2 are suspended by the soot weight detection sensors 16A and 16B (not shown).

Figure 17:
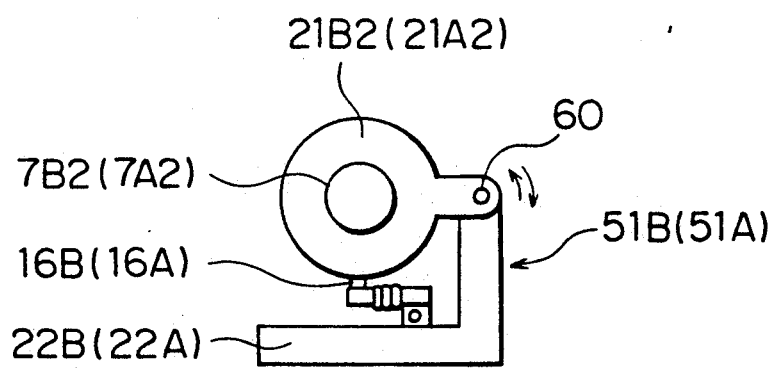
FIG. 17 is a sectional view of a vertical movement guide mechanism in an optical fiber soot synthesis apparatus of an embodiment of the present invention.

As the couplings for absorbing the displacement of the shafts of the driven shaft portions 7A2 and 7B2, use may be made of (not shown) magnetic couplings, fluid couplings, and the like in addition to the above-mentioned universal joints 29A and 29B. As shown in FIG. 17, it is preferable to make the vertical movement guide mechanisms 51A and 51B a rotary type vertical movement guide mechanism using a pivot support shaft 60. By this construction too, the weight acting on the soot weight detection sensors 16A and 16B can be reduced.

Note that in FIG. 15, the balance weights 55A and 55B are provided at two locations at the top and bottom at the side of the driven side brackets 21A2 and 21B2, but it is also possible to provide them at a single suitable location at the side.

Above, an explanation was made of embodiments of an optical fiber soot synthesis apparatus of the present invention, but the optical fiber soot synthesis apparatus of the present invention may be comprised of a suitable combination of the constructions shown in the above-mentioned embodiments. Further, the present invention is not limited to the above-mentioned construction. Various modifications may be made based on the concept of the present invention.

We claim:

1. Apparatus for synthesizing an optical fiber preform comprising an elongated optical fiber core member having a pair of spaced end portions and an elongated central portion, and a cladding layer of soot formed on said central portion of the core member, said apparatus comprising:

a core member support and rotational drive mechanism for supporting a said core member for rotation about a horizontal axis, said rotational drive mechanism including a pair of spaced core member support and rotational drive units, said units being horizontally spaced apart and arranged so that the optical fiber core member extends horizontally between the units with one end portion of the core member supported by one of the units and with the other end portion of the core member supported by the other of the units;

a burner for synthesizing and discharging optical fiber soot material to be deposited on the central portion of the core member and an oxyhydrogen flame, said burner being disposed between said units beneath the central portion of the core member supported for rotation by said mechanism;

a housing presenting a chamber for accommodating the burner, the central portion of the core member, and the soot material generated by said burner;

a reciprocation drive assemblage for reciprocating the core member and the burner relative to one another in a horizontal direction; and a weight measuring mechanism for measuring the weight of the core member and the soot material deposited thereon, said weight measuring mechanism including a pair of spaced weight measuring components, said components being disposed between said core member support and rotational drive units and being horizontally spaced apart so that said central portion of the core member is positioned therebetween.

2. An apparatus as set forth in claim 1, wherein each of said drive units includes
   an elongated axial support component for supporting a corresponding end portion of the core member, said support component having a center segment and a pair of spaced ends and being disposed for rotation about a horizontal axis in alignment with said core member with one end of the support component in engagement with the corresponding end portion of the core member,
   a rotational drive unit supporting the other end of said support component,
   a first support bracket supporting said drive unit,
   a second support bracket disposed between the first bracket and said one end of the support component and beneath said center segment of the core member, and
   a bearing assembly carried by said second support bracket for rotatably supporting said center segment of the core member,
   a corresponding one of said weight measuring components being mounted on said second support bracket.

3. An apparatus as set forth in claim 2, wherein said support component includes a weight relieving coupling disposed between said first and second brackets.

4. An apparatus as set forth in claim 1, wherein said apparatus includes a computation and control device for receiving weight measuring signals from said weight measuring components and calculating the mass of the soot material deposited on said core member.

5. An apparatus as set forth in claim 1, wherein said computation and control device operates to discontinue the operation of the burner when the mass of the soot material on the core member reaches a predetermined value.

6. An apparatus as set forth in claim 5, wherein said device operates to rotate the core member via said drive units at two different rotational speeds and calculate said mass as a function of the two measured weights determined at the respective speeds.

7. An apparatus as set forth in claim 6, wherein said apparatus includes a detector for detecting the rotational speed of the core member.

8. An apparatus as set forth in claim 1, wherein each of said drive units includes
   an elongated axial support component for supporting a corresponding end portion of the core member, and
   a rotational drive units supporting the support component.

9. An apparatus as set forth in claim 8, wherein said support components include weight relieving couplings to isolate the weight measuring components from the rotational drive units.

10. An apparatus as set forth in claim 9, wherein said apparatus includes a computation and control device for receiving weight measuring signals from said weight measuring components and calculating the mass of the soot material deposited on said core member.

11. An apparatus as set forth in claim 10, wherein said computation and control device operates to discontinue to operation of the burner when the mass of the soot material on the core member reaches a predetermined value.

12. An apparatus as set forth in claim 1, wherein each of said drive units includes
   a drive side bearing disposed on the axis of rotation of the core member,
   a drive side bracket disposed adjacent said bearing between said bearing and said core member,
   a driven side bracket disposed between said drive side bracket and said core member,
   an elongated axial support component for supporting a corresponding end portion of the core member, said component having a drive shaft portion supported by said drive side bearing and a driven shaft portion supported by said driven side bearing, said driven shaft being connected to a corresponding end of said core member for rotation of the core member with the driven shaft,
   a coupling mechanism axially interconnecting said shaft portions for rotation together,
   a driven side bracket vertical movement enabling mechanism for enabling the driven side bracket to move vertically in response to weight applied to the driven side bracket, and a rotational drive mechanism for transmitting rotation to said support component through said drive side bearing.

13. An apparatus as set forth in claim 12, wherein said weight measuring components are disposed beneath said vertical movement enabling mechanisms.

14. An apparatus as set forth in claim 12, wherein each of said coupling mechanisms comprises a pair of universal joints.

15. An apparatus as set forth in claim 12, wherein each of said enabling mechanisms includes a vertical guide rail for guiding the vertical movement of the corresponding driven side bracket.

16. An apparatus as set forth in claim 12, wherein each of said enabling mechanisms includes a vertical frame and a swiveling arm rotatably mounted on the frame, said driven side brackets being mounted on said arms.

17. An apparatus as set forth in claim 16, wherein each of said arms has a pair of spaced ends, and each of said enabling mechanisms includes a balance weight located at one end of a corresponding arm, said driven side brackets being mounted at the other ends of the arms.

18. An apparatus as set forth in claim 16, wherein each of said enabling mechanisms includes a vertical frame, a two-ended tension spring having one end attached to said frame, and an elongated spring receiving arm having a pair of spaced ends, one end of said arm being attached to the other end of the spring and the other end of the arm being connected to the drive side bracket at a support point.

19. An apparatus as set forth in claim 12, wherein said apparatus includes a computation and control device for receiving weight measuring signals from said weight measuring components and calculating the mass of the soot material deposited on said core member.

20. An apparatus as set forth in claim 19, wherein said computation and control device operates to calculate the difference between the initial weight of the core member and the weight of the core member and soot material deposited thereon as a function of the signals received from the weight measuring components, to calculate the gravity position of the deposited soot material and the eccentricity of said gravity position, and to calculate the mass of the deposited soot material.

21. An apparatus as set forth in claim 20, wherein said computation and control device operates to discontinue to operation of the burner when the mass of the soot material on the core member reaches a predetermined value.

22. An apparatus as set forth in claim 12, wherein said apparatus includes balance weights for preventing the inclination of the driven side brackets.

23. An apparatus as set forth in claim 22, wherein said apparatus includes a computation and control device for receiving weight measuring signals from said weight measuring components and calculating the mass of the soot material deposited on said core member.

24. An apparatus as set forth in claim 23, wherein said apparatus includes inclination detecting sensors for detecting the inclination of said driven side brackets, said control device operating to adjust the position of said balance weights as a function of signals received from said inclination detecting sensors to thereby prevent inclination of the driven side brackets.

25. An apparatus as set forth in claim 12, wherein each of said drive units includes a vertical movement guide mechanism which rotates about a pivot point in response to changing in the respective vertical positions of the brackets.

26. An apparatus as set forth in claim 1, wherein said reciprocation drive assemblage includes a mechanism for reciprocating said support and rotational drive mechanism in the horizontal direction relative to the burner.

27. An apparatus as set forth in claim 1, wherein said reciprocation drive assemblage includes a mechanism for reciprocating said burner in the horizontal direction relative to the support and rotational drive mechanism.

28. An apparatus as set forth in claim 1, wherein said weight measuring components are load cells or strain gauges.

29. An apparatus as set forth in claim 1, wherein said drive units each includes a chuck and a shaft connected to the chuck.

30. Apparatus for synthesizing an optical fiber preform comprising an elongated optical fiber core member having a pair of spaced end portions and an elongated central portion, and a cladding layer of soot formed on said central portion of the core member, said apparatus comprising:

a core member support and rotational drive mechanism for supporting a said core member for rotation about a horizontal axis, said rotational drive mechanism including a pair of spaced core member support and rotational drive units, said units being horizontally spaced apart and arranged so that the optical fiber core member extends horizontally between the units with one end portion of the core member supported by one of the units and with the other end portion of the core member supported by the other of the units;

a burner for synthesizing and discharging optical fiber soot material to be deposited on the central portion of the core member; and a weight measuring mechanism for measuring the weight of the core member and the soot material deposited thereon, said weight measuring mechanism including a pair of spaced weight measuring components, said components being disposed between said core member support and rotational drive units and being horizontally spaced apart so that said central portion of the core member is positioned therebetween.

31. An apparatus as set forth in claim 30, wherein said apparatus includes a computation and control device for receiving weight measuring signals from said weight measuring components and calculating the mass of the soot material deposited on said core member in real time.

32. An apparatus as set forth in claim 30, wherein said apparatus includes a weight adjusting mechanism mounted on each of said support and rotational drive mechanisms for preventing weight measurement interfering binding forces from being imposed on said weight measuring mechanism.

33. An apparatus as set forth in claim 32, wherein said apparatus includes a computation and control device for receiving weight measuring signals from said weight measuring components and calculating the mass of the soot material deposited on said core member in real time.

* * * * *